Oct. 30, 1928.  
S. T. ALLEN  
1,689,907  
PUNCTURE SEALING INNER TUBE  
Filed March 14, 1928
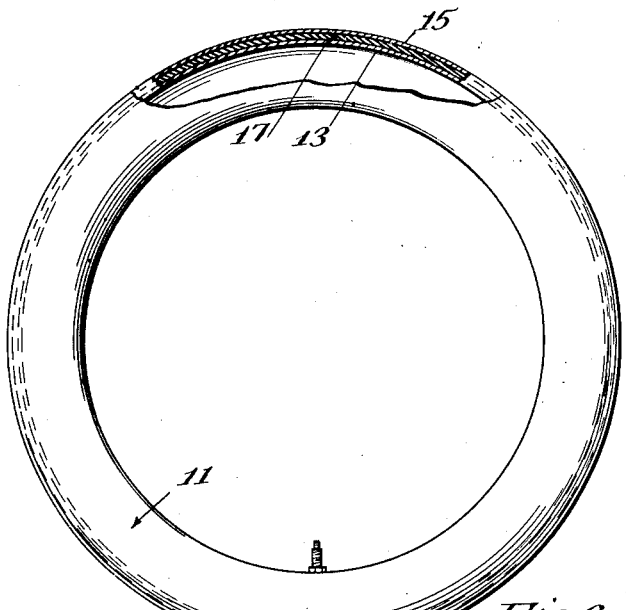
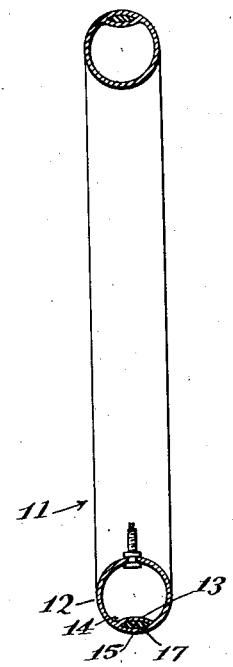
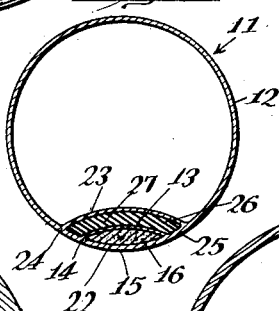
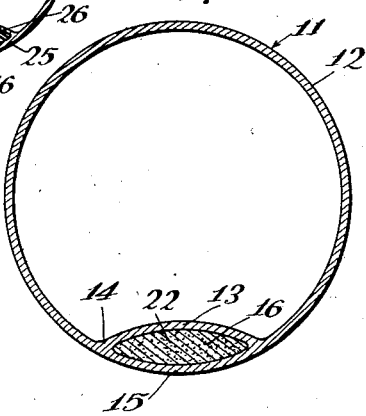
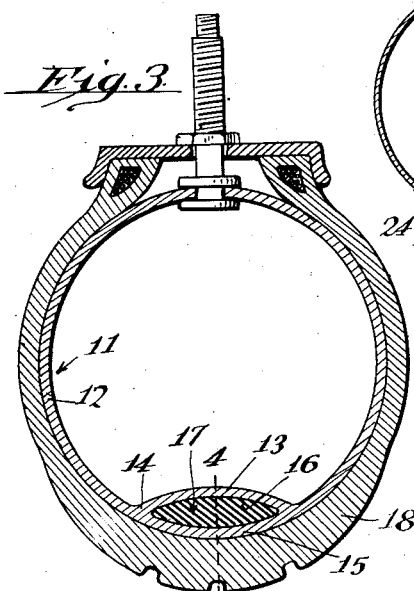
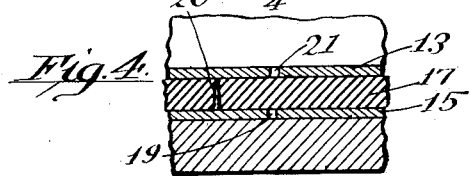
Inventor  
Sherman T. Allen  
by Hazard and Miller  
Attorneys Patented Oct. 30, 1928.

1,689,907

UNITED STATES PATENT OFFICE.

SHERMAN T. ALLEN, OF LOS ANGELES, CALIFORNIA.

PUNCTURE-SEALING INNER TUBE.

Application filed March 14, 1928. Serial No. 261,617.

My invention is a puncture sealing inner tube adapted for pneumatic tires.

An object of my invention is the construction of an inner tube for use with pneumatic tires in which a portion of such tube is constructed with a self-sealing medium therein to seal the inner tube should it be punctured by nails or tacks or similar devices. And in this connection a more detailed object of my invention is having the sealing material entirely separate, distinct and spaced from the air in the pneumatic tire.

A further object of my invention is to construct an inner tube with a distinct chamber therein in which a sealing material may be carried, this sealing material functioning to close up a puncture. In this connection a more detailed object of my invention is the formation of such chamber with the outer wall forming a part of the rubber forming the outer wall of the tube and having an inner wall connected to such outer wall whereby the sealing material contained between such inner and outer walls is maintained absolutely separate from the air in the inner tube.

A still further object of my invention is the formation of an inner tube with a distinct chamber formed therein inside of the tube and adjacent one portion of the periphery of such tube, and in this chamber having a suitable filling of sealing material, this material being adapted to stretch or have a shifting action to seal a puncture formed either in the outer wall of the chamber, the inner wall, or both. A more detailed characteristic of this feature of my invention is forming the filling for the said chamber of a rubber composition which does not adhere to the outer wall of the inner tube or to the inner wall, which, with the outer wall, forms the above mentioned chamber.

A further object of my invention is filling the chamber either with a filling strip of rubber which may be drawn into the chamber in the manufacture of the inner tube, or with a semi-plastic material which will ooze through punctures formed in the inner tube adjacent the above mentioned chamber.

So-called puncture-proof pneumatic tires have been made by incorporating a soft rubber in the layers of the structure forming the tire, this material being adapted to fill holes formed in the tire by puncturing, but such arrangements have been unsatisfactory.

Also, in inner tubes a semi-plastic material has been used to seal punctures but this material plugs up the valves when air is let out of the tire and is otherwise unsatisfactory.

In constructing my invention I may form an inner tube substantially as in the ordinary practice, by extrusion of a mass of rubber through suitable dies, except that these dies are arranged to form an inner wall adjacent the tread portion of the inner tube. This forms an annular chamber extending around the inner tubes after they are connected and vulcanized, but before such connection and vulcanizing a soft rubber strip may be drawn through such chamber, this strip being arranged so as to have but little adherence to the walls of the chamber; or, if desired, the chamber may be filled with a semi-plastic rubber composition. If desired the tube may be made up with a plurality of chambers, each having a strip of soft rubber or semi-plastic composition therein.

My invention is illustrated in the accompanying drawings, in which:

Figure 1 is a side elevation of an inner tube partly broken away at the tread portion.

Fig. 2 is a vertical transverse section through an inner tube.

Fig. 3 is a transverse section through an inner tube, a casing and a rim.

Fig. 4 is a longitudinal section on the line 4—4 indicating the action of the filler strip in case of a puncture.

Fig. 5 is a cross-section of an inner tube, showing a modified form of filler in the chamber.

Fig. 6 is a cross-section of an inner tube showing a plurality of chambers with plastic material and filling strips therein.

The inner tube is designated generally by the numeral 11 and is formed with what may be termed the wall structure 12, this, when inflated, being circular in cross-section. On each side of the tread portion there is formed an inner wall 13 joined to the outer wall by annular junction portions 14. The outer wall at the tread portion 15 and such inner wall 13 form in effect a chamber 16 which extends around the tire, forming an annular chamber which may be the desired width across the tread desired.

In the construction illustrated in Figs. 2 and 3, this chamber is shown as filled with a filling strip 17 preferably formed of soft rubber and either drawn into such chamber before the tire is made up into circular formation, or this may be forced into such chamber by an extruding process.

In one manner of making inner tubes the wall structure 12 of the tubes is formed by an extruding process and at the same time the inner wall 13 may be formed. The inner surface and the outer surface of the wall 13, and the portion 15 of the tread may be coated with a suitable powder or like preparation to prevent these vulcanizing together in the vulcanizing procedure. Thus, when the strip 17 is drawn or filled into such chamber, this strip does not adhere or vulcanize to the tread portion 15 or to the wall portion 13 of the inner tube, but such strip may have a creeping or stretching action, giving a slight relative motion thereto in relation to the tread portion and the wall portion 13.

Thus, if the casing 18 is punctured, such as by a nail which passes through the tread portion 15, leaving a hole as indicated at 19 and also leaving an impression 20 in the filling 17, when the nail is withdrawn the strip 17 will stretch or shift in one direction or the other so that the hole 19 and the impression 20 are not in alignment.

Therefore, if a nail or the like making a puncture passes through the inner wall 13, as indicated at 21, there will be a shifting of the nail hole 20 from alignment with the holes 19 and 21. Even should there be insufficient stretching or slippage of the filler 17, nevertheless the soft rubber of such strip will function to seal the hole made in the strip and prevent deflation of the tire.

In the construction shown in Fig. 5, the main wall structure 12, the inner wall 13 and the tread portion 15 are the same as shown in Fig. 3, but in this case I utilize a semi-plastic filler 22. This filler may be filled in the chamber 16 after the inner tube is finished and vulcanized, and then the aperture through which it is filled in may be sealed over.

This type of semi-plastic filler is adapted to ooze through any puncture holes which may be in the tread portion or inner wall 13 and thus seal the tube. With the semi-plastic material confined in the chamber such as illustrated, this material can not foul the valve when air is let out of the tire, therefore overcoming one of the main objections to having a semi-plastic or semi-fluid filler in the tire.

In Fig. 6 I illustrate a type of inner tube having two layers of puncture-preventing materials. In this case I make the tire with an outer wall structure 12 and with a first inner wall structure 13, there being the tread portion 15 as in the other constructions. This forms a first chamber 16 which is illustrated as having a semi-plastic or semi-liquid filling material 22 therein. I also use a second inner wall 23 which is joined to the wall structure 12 at the annular junctions 24. This with the wall 13 and the portions 25 of the wall structure 12 form a second chamber 26. This chamber is illustrated as being filled with a filling strip 27 which may be of the same character as the filling strip 17 of Figs. 2 and 3. The construction, therefore, of Fig. 6 gives the benefit of having both types of puncture-sealing material confined in the inner tube.

While the semi-plastic material is illustrated as being adjacent the tread portion, it is obvious that these may be reversed and the filling strip of relatively stiff material may occupy the first chamber 16 adjacent the tread and the semi-liquid or semi-plastic material be on the inside, thus giving a double protection in sealing punctures. It is to be understood that also in the construction shown in Fig. 6 the layers may be comparatively small compared with the size of the tire.

It will thus be seen by the above mentioned constructions as illustrated in the drawings that I have developed an inner tube of the self-sealing so-called puncture proof type in which the puncture sealing material is out of contact with the air in the tires and also the material is confined to the specific portion of the inner tube adjacent the tread which is the part usually punctured.

Various changes may be made in the principles of my invention without departing from the spirit thereof, as set forth in the description, drawings and claim.

I claim:

A pneumatic tire tube having an outer wall, an inner wall connecting portions of said tube, forming an annular chamber, and a rubber-like filling material in said chamber, said filling material being non-adherent to the outer wall and inner wall to allow slight slippage of said material relative to the outer and inner walls.

In testimony whereof I have signed my name to this specification.

SHERMAN T. ALLEN.